May 5, 1959  O. A. YOST  2,884,955
LIQUID PIPE LINE PRESSURE COMPENSATOR
Filed June 27, 1956
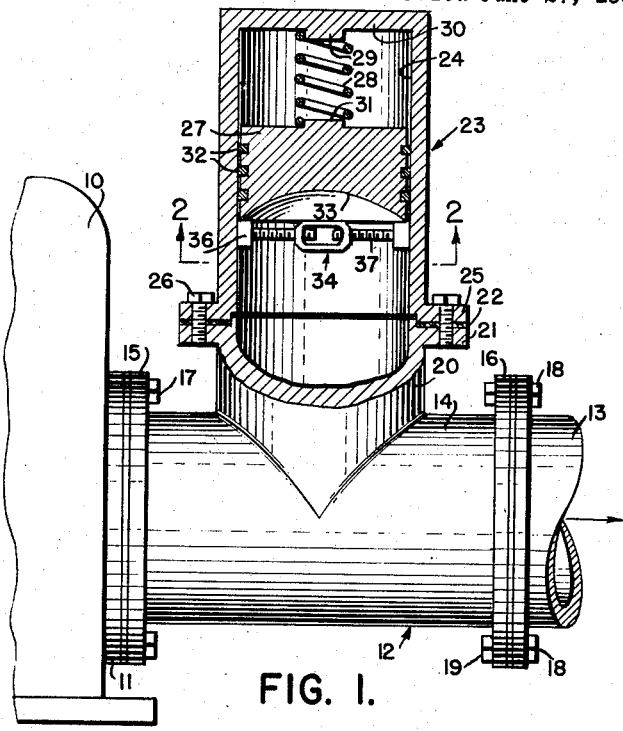
FIG. 1.
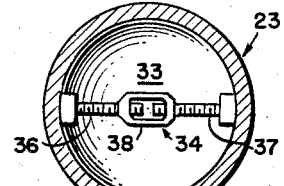
FIG. 2.
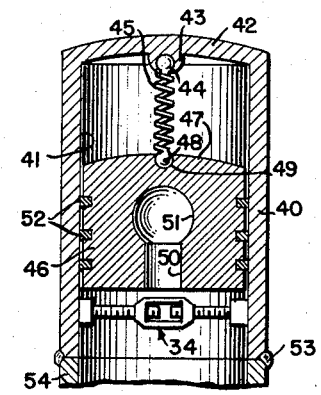
FIG. 3.
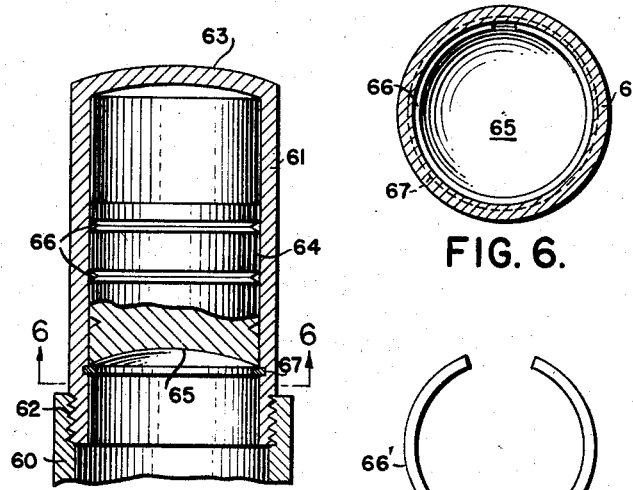
FIG. 5.     FIG. 6.
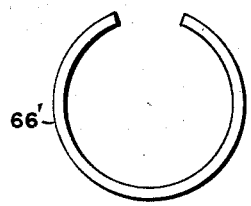
FIG. 4.
FIG. 7.
INVENTOR.
Oscar A. Yost
BY
*L. S. Saulsbury*
ATTORNEY

United States Patent Office 2,884,955
Patented May 5, 1959

2,884,955
LIQUID PIPE LINE PRESSURE COMPENSATOR

Oscar A. Yost, New York, N.Y.

Application June 27, 1956, Serial No. 594,138

5 Claims. (Cl. 138—31)

This invention relates to a liquid pipe line pressure compensator.

It is the principal object of the present invention to provide a self-contained liquid pipe line pressure compensator adapted to be placed in a pipe line to prevent water hammer, and pulsations which, may be as easily installed in the pipe line as an ordinary T-fitting may be installed between two pipe parts or upon the discharge end of a pump externally thereof and wherein the compensating parts are attached to and supported upon the intermediate opening of the fitting free of the connections with the pipe parts.

It is another object of the invention to provide a liquid compensator for use in pump supply lines that will maintain a steady even pressure of the liquid in the pipe line.

It is still another object of the invention to eliminate the need in the castings of pumps of old type air chambers and provide an equivalent and effective device that can be placed in the pipe lines indepedently of the pump and thereby lessen the cost of forming the air chambers on the standard pumps and at the same time overcome the numerous faults and disadvantages of air chamber type of pumps and to provide equivalent means external of the pump that will give positive cushioning effect to the liquids during the pumping operations.

It is still another object of the invention to place in the water line a liquid pressure compensator which is not dependent upon the cushioning effect of air to equalize the line pressure from the pump wherein the contact of the liquid is in engagement with a pressure biased piston rather than piston in the direct contact with the air as when the pressure is maintained by an air chamber.

It is a further object of the present invention to provide a liquid compensator that can be readily installed in small pipe lines in place of the T-fitting nearest to the pressure gauges in an engine room or gauge board installations so as to prevent fluctuations of the gauges and so that a true reading, operation and greater life of the gauges can be had.

It is a still further object of the invention to provide a liquid pressure compensator for pipe lines which can be made from a simple cylindrical casting that requires but a simple straight reaming operation to obtain the true cylindrical chamber, a standard type piston to fit the same, a standard T-fitting, a compression spring, piston keepers to keep the piston elevated in the cylinder likewise and formed of standard parts and either in the form of a turn buckle spreader or a spring ring adapted to lie within a groove in the cylinder wall.

Other objects of the present invention are to provide a liquid pipe line pressure compensator having the above objects in mind which is of simple construction, has a minimum number of parts, inexpensive to manufacture, easy to assemble in the pipe line, compact, consumes little space, durable, light in weight, effective and efficient in use.

For a better understanding of the invention, reference may be had to the following detailed description taken in connection with the accompanying drawing, in which Figure 1 is an elevational view of the liquid pipe line pressure compensator constructed according to one form of the invention with portions broken away to show the interior construction thereof, Fig. 2 is a transverse sectional view taken on line 2—2 of Fig. 1 and through the cylinder and looking upwardly upon the keeper and liquid engaging face of the piston, this view being taken on line 2—2 of Fig. 1, Fig. 3 is a vertical sectional view of a liquid compensator constructed according to another form of the invention wherein the cylinder is welded to the T-fitting and a chamber is provided in the piston to accumulate the liquid and enlarge the area of contact of the liquid therewith and to stabilize the piston movement within the cylinder, Fig. 4 is a plan view of the turn buckle keeper used in the forms of the invention shown in Figs. 1 and 3, Fig. 5 is a vertical sectional view of the liquid compensator constructed according to a still further form of the invention in which piston rings are dispensed with and a spring ring used as a keeper, Fig. 6 is a transverse sectional view taken on line 6—6 of Fig. 5 and looking upwardly upon the spring ring keeper and upon the liquid engaging face of the piston, and Fig. 7 is a plan view of the spring ring keeper.

Referring now particularly to Figures 1 and 2, 10 represents a liquid pump having a discharge outlet 11. To this discharge outlet there is secured a liquid compensator designated generally at 12 and to which a pipe line 13 is connected. The liquid compensator 12 comprises a T-fitting 14 that may have flanges 15 and 16 on the opposite ends by which with the use of securing bolts 17 the T-fitting can be secured to the pump discharge outlet 11 and by the use of bolts 18 and nuts 19 the pipe line 13 can be secured to the T-fitting.

The T-fitting has an intermediate extension 20 with a flange 21 thereon over which is disposed a sealing ring 22. A cylindrical body 23 formed from a casting and having an internal cylinder wall 24 is formed by a simple seaming operation therein. This cylinder 23 has a flange 25 by which it is secured over the sealing ring 22 and upon the flange 21 of the intermediate extension 20 of the T-fitting and made hermetically secure by machine bolts 26 with its cylinder wall opening 24 in direct communication with the opening in the extension 20 of the T-fitting. Liquid being discharged from the pump will accordingly be elevated into the cylinder 23.

In order to provide a pressure upon this liquid and to maintain it at all times under pressure within the pipe line 13 without the accumulation of air therein a piston 27 is vertically slidable within the cylinder and is normally urged by a heavy compression spring 28 extending from a central guide projection 29 in closed upper end 30 of the cylinder 23 and a guide projection 31 on the top of the piston 27. Any air between the top of the piston 27 and the closed upper end 30 of the cylinder will also serve as a cushion to resist the water pressure below the piston and combine with spring and the weight to stabilize the water pressure within the line. The piston has a plurality of piston rings 32 for preventing leakage of fluid past the piston into the space in the upper end of the cylinder. The underface of the piston 27 is concaved as indicated at 33 to increase the area of liquid contact with the piston face and to stabilize the movement of the pistons within the cylinder.

In order to keep the piston elevated within the cylinder 23 a turn buckle keeper device 34 is used. This keeper device is made of two headed bolts of opposite threads 36 and 37 with a turn buckle 38 disposed between them and serving to spread or contract the bolts to fix or release the keeper from the cylinder 23.

As the pressure in the pipe line is built up the liquid will enter the cylinder 23 and engage the piston 27 which will maintain a constant pressure upon the liquid by the means of spring, air expansion and weight of the piston.

Referring now to the form of the invention shown in Fig. 3, 40 represents a cylinder that has an internal cylindrical wall 41 and a closed rounded top portion 42. Depending centrally from the top portion 42 is a socket projection 43 that receives a ball end connection 44 of a compression spring 45. Operable in the cylinder is a piston 46 that has a rounded top surface 47 and a socket opening 48 for receiving a ball end 49 on the other end of the spring 45. The ball ends of the spring 45 working in the socket openings in the cylinder and the piston will serve to prevent the spring from placing any side thrust upon the piston as the piston is moved in the cylinder and thereby render the spring more effective. The piston 46 has a central opening 50 terminating in a centrally disposed spherical cavity 51 located adjacent to the center of gravity of the piston which will become filled with the liquid under pressure and thereby tend to help to keep the piston centrally aligned and stabilized within the cylinder while the piston is being elevated under the pressure of the liquid. Piston rings 52 keep the liquid from leaking past the piston and maintain the air in the upper end of the cylinder so that use can be made of its cushioning effect. The piston 46 will be held against downward displacement by the turn buckle keeper 34 described in detail above in connection with the first form of the invention. The cylinder 40 is secured to an intermediate portion 52 of a T-fitting by a peripheral weld 53.

The liquid pipe line pressure compensator may take a more simple form as shown in Figs. 5, 6 and 7 and be adapted for use in the pipe line with line pressure gauges to reduce the fluctuations of the gauge needle and allow more accurate readings to be taken from the gauge. According to this form of the invention the T-fitting is provided with an internally-threaded intermediate portion 60 to which a cylinder 61 is threadedly connected as indicated at 62. This cylinder 61 has a closed convex top portion 63 and workable within this cylinder is a piston 64. The piston 64 has a concaved bottom face 65 that is engaged by the liquid in the pipe line so as to force the piston upwardly whereby the piston will be cushioned in its upward movement by the air lying in the space between the upper face of the piston and the closed top portion 63. The liquid pressure is thereby resisted by the air and the weight of the piston. The sealing effect is had by the collection of water in a plurality of vertically-spaced small peripheral grooves 66 in the piston as is characteristic of a plug type piston used in steam pipe line installations. The plug piston 64 is limited in its downward displacement within the cylinder by a spring retaining ring 66' fitted into a peripheral groove 67 in the cylinder wall.

It should now be apparent that there has been provided a liquid pipe line pressure compensator that can be disposed in pump supply lines receiving liquid supplied from a pump which will equalize and maintain a constant pressure of the liquid being supplied to these pipe lines by these pumps and that has the effect to eliminate water hammer and water pulsations normally inherent with such pumping systems.

It should also be apparent that there has been provided a self-contained unit which can be placed in the pipe line in the same manner as an ordinary T-fitting can be placed in the line and that this unit is not only easy to install but is easy to manufacture in that it may be made in the main from standard parts and with little labor costs.

While various changes may be made in the detailed construction, it shall be understood that such changes shall be within the spirit and scope of the present invention as defined by the appended claims.

What is claimed is:

1. A liquid pipe line pressure compensator comprising a pipe line, a body housing member adapted to be fitted into the pipe line and secured to and between pipe parts thereof, a closed end cylinder connected to the body member in communication therewith into which the liquid from the pipe line can be elevated, a substantially leak-proof piston operable in said cylinder and having direct contact with the liquid under pressure passing through said body, said cylinder providing an air chamber above the piston in which the air therein may be compressed to resist the upward movement of the piston, and adjustable means in the cylinder spaced from the ends thereof and secured to the sides of the cylinder with lateral force for limiting the downward displacement of the piston within the cylinder and to maintain the piston elevated in the cylinder.

2. A liquid pipe line pressure compensator as defined in claim 1, and a compression spring disposed in the air chamber and reacting between the closed end of the cylinder and the piston.

3. A liquid pipe line pressure compensator as defined in claim 2, and the closed end of said cylinder and the upper end of the piston having centrally disposed ball socket openings, and said compression spring having ball end formations respectively operable in said socket openings whereby to keep the spring centralized therebetween.

4. A liquid pipe line pressure compensator as defined in claim 2, and said piston having a central opening therein to permit the entrance of the liquid under pressure into the piston and thereby stabilize the piston within the cylinder.

5. A liquid pipe line pressure compensator as defined in claim 1, and said means for limiting the downward displacement of the piston in the cylinder comprising an arrangement employing right and left hand threaded bolts and a turn buckle connected therebetween operable upon the bolts to expand the same against the side walls of the cylinder.

References Cited in the file of this patent

UNITED STATES PATENTS

| 917,001 | Chase | Apr. 6, 1909 |
| 2,543,175 | Kilgore | Feb. 27, 1951 |
| 2,592,613 | Snyder | Apr. 15, 1952 |
| 2,775,255 | Snyder | Dec. 25, 1956 |

FOREIGN PATENTS

| 563,538 | Great Britain | Jan. 18, 1944 |